June 19, 1934.　　　　E. MANASEK　　　　1,963,908
CLAMP
Filed July 19, 1932
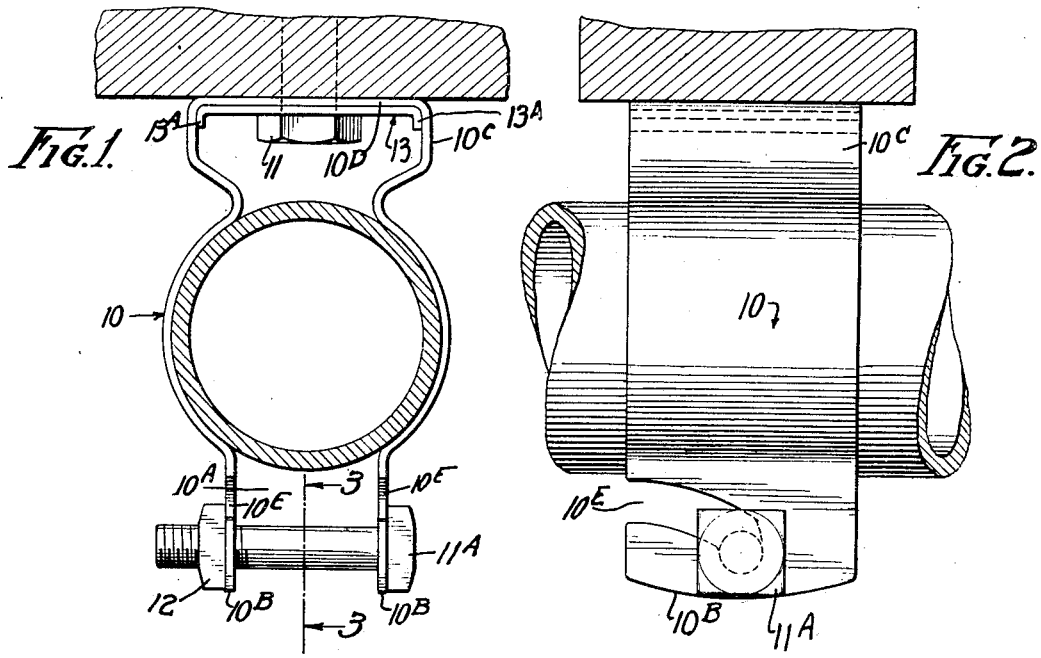
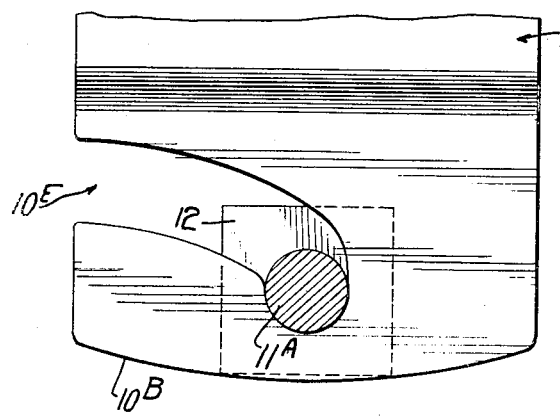
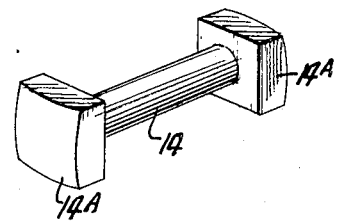
Inventor:
Emil Manasek,
By: Frank J Schraeder Jr
Atty.

Patented June 19, 1934

1,963,908

UNITED STATES PATENT OFFICE 1,963,908

CLAMP

Emil Manasek, Brookfield, Ill.

Application July 19, 1932, Serial No. 623,429

1 Claim. (Cl. 248—31)

This invention relates to improvements in clamps and has particular reference to a new and improved clamp for supporting electrical conduits or cables. My clamp is also readily adaptable to use as a pipe hanger.

One of the objects of my invention is to provide a clamp of the character described which can be quickly installed to thus materially reduce the cost of installation of electrical conduits, pipe or the like. In clamps now in common use comprising a metal band, the ends are provided with holes through which a bolt must be inserted and a nut must be screwed onto the end of such bolt. This operation of inserting the bolt through the ends of the band is retarded by the fact that the band ends must be brought together by a pair of pliers and held in alignment until the bolt is inserted through the holes therein and the nut applied. If the nut is accidently dropped by the workman, the operation must be repeated. My invention renders it possible to secure the ends of the band without removing the nut from the bolt or by inserting a unit retainer simulating a bolt and nut.

Another object of my invention is to provide a clamp of the above-stated character which is formed with parallelly disposed spaced ends and an intermediate flattened portion for connection to a support; the spaced ends each being provided with a slot disposed from one edge of the band toward the center of the band and the ends being adapted to be secured and retained together by a retainer or bolt which is slidably insertable into the slots within the spaced ends.

With the above and other objects in view, my invention consists in the novel combination and construction of the parts shown in preferred embodiment in the attached drawing, described in the following specifications and particularly pointed out in the appended claim.

Referring to the drawing:

Fig. 1 is an end view of a clamp embodying my invention and showing its application as a conduit support;

Fig. 2 is a side view of same;

Fig. 3 is a section taken on line 3—3 of Fig. 1, and

Fig. 4 is a view of a unit retainer for securing the clamp.

The clamp 10 as shown in the drawing, consists of a single band or strap of metal formed about a circle of predetermined diameter with an opening 10$^A$ on one side thereof and near the spaced ends 10$^B$ which project outwardly in substantially parallel spaced relation.

Diametrically opposite the spaced ends 10$^B$, the body of the band is looped outwardly as at 10$^C$ and the central portion of the loop 10$^C$ is flattened as at 10$^D$ to afford a flattened surface for connection by means of a bolt or screw 11, or the like, to a support.

The ends 10$^B$ of the clamp are each provided with a slot 10$^E$, which slots 10$^E$ are disposed in alignment with each other from one edge of the band toward the center of the band.

The inner ends of the slots 10$^E$ are preferably slightly enlarged to facilitate the seating of the retainer therein.

As shown in Figs. 1 and 2, the retainer consists of a bolt 11$^A$ having a tightening nut 12, but such retainer may be made in one piece, as shown in Fig. 4, which consists of round bar 14 having heads 14$^A$ formed integrally with the ends thereof.

In the adaptation of my clamp to support heavier conduit or pipe, I prefer to provide on the inner face of the flattened portion, a stiffer plate 13 having its ends 13$^A$ slightly curved to abut within the loop formation to thus stiffen the supporting portions of the clamp.

From the illustrations, and the above description, it is obvious that I have provided a clamp of the kind described which facilitates the installation of conduits or pipe and affords a substantial saving in cost of such installation.

I claim:

A conduit clamp including resiliently associated sections normally spaced free of the conduit and adapted to be forced together to clamp the conduit, said sections being connected at one end and spaced at the opposite end, lips extending from the spaced ends of the clamp in substantially parallel relation and providing means whereby the sections may be temporarily forced together for clamping cooperation, each of the lips being formed with bolt-receiving openings to receive a headed fastening member to hold the lips and thereby the sections in operative relation resulting from the temporary holding of the lips, each lip being formed with a slot leading from the opening therein and opening through a free edge of the lip, the slots being aligned transversely of the clamp and affording means to permit a headed fastening member to be simultaneously introduced into the openings while the temporary pressure is maintained on the lips.

EMIL MANASEK.